United States Patent
Manzano et al.

(10) Patent No.: US 11,249,889 B2
(45) Date of Patent: Feb. 15, 2022

(54) ANOMALY FEEDBACK MONITORING AND DETECTION SYSTEM

(71) Applicant: salesforce.com, inc., San Francisco, CA (US)

(72) Inventors: Ignacio Agustin Manzano, Buenos Aires (AR); Agustin Lopez Gabeiras, Buenos Aires (AR); Leandro Damián Lück, Buenos Aires (AR); Gaston Alberto Lodieu, Buenos Aires (AR); Diego Gabriel Larralde, Buenos Aires (AR); Jiang Wu, Mountain View, CA (US); Andrew Craig Bragdon, Brentwood, CA (US)

(73) Assignee: salesforce.com, inc., San Francisco, CA (US)

( * ) Notice: Subject to any disclaimer, the term of this patent is extended or adjusted under 35 U.S.C. 154(b) by 166 days.

(21) Appl. No.: 16/254,193

(22) Filed: Jan. 22, 2019

(65) Prior Publication Data

US 2020/0233791 A1    Jul. 23, 2020

(51) Int. Cl.
*G06F 11/00* (2006.01)
*G06F 11/36* (2006.01)

(52) U.S. Cl.
CPC ...... *G06F 11/3688* (2013.01); *G06F 11/3684* (2013.01)

(58) Field of Classification Search
CPC ... G06F 11/36; G06F 11/3684; G06F 11/3688
See application file for complete search history.

(56) References Cited

U.S. PATENT DOCUMENTS

| | | | |
|---|---|---|---|
| 9,842,017 B1* | 12/2017 | Zhang | G06F 11/3452 |
| 10,642,719 B1* | 5/2020 | Balasubramanian | G06F 11/3055 |
| 2012/0131116 A1* | 5/2012 | Tu | H04W 4/20 709/206 |
| 2013/0031423 A1* | 1/2013 | Barrow | G06F 11/3616 714/47.2 |
| 2016/0335168 A1* | 11/2016 | Freiberg | G06F 8/436 |
| 2017/0264579 A1* | 9/2017 | Fang | H04L 67/2842 |
| 2018/0183823 A1* | 6/2018 | Fadlil | G06N 3/08 |
| 2018/0314622 A1* | 11/2018 | Lowe | G06F 9/44526 |
| 2019/0294485 A1* | 9/2019 | Kukreja | G06F 11/0775 |
| 2020/0220875 A1* | 7/2020 | Harguindeguy | H04L 63/101 |
| 2020/0233791 A1* | 7/2020 | Manzano | G06F 11/3684 |
| 2020/0250070 A1* | 8/2020 | Willson | G06F 11/3688 |

\* cited by examiner

*Primary Examiner* — Philip Guyton
(74) *Attorney, Agent, or Firm* — Sterne, Kessler, Goldstein & Fox P.L.L.C.

(57) ABSTRACT

Disclosed herein are system, method, and computer program product embodiments for providing anomaly feedback monitoring and detection. An embodiment operates by determining a first set of data corresponding to an anomaly indicating an undesirable data state for a first application. A subset of data from a second set of data corresponding to the undesirable data state is identified, wherein the second set of data is associated with communications between the first application and a second application. A notification identifying the anomaly is provided. Feedback associated with the anomaly is received. Data corresponding to the anomaly is updated based on the feedback.

20 Claims, 6 Drawing Sheets

ANOMALY FEEDBACK MONITORING AND DETECTION SYSTEM

CROSS REFERENCE TO RELATED APPLICATIONS

This application is related to U.S. patent application Ser. No. 16/254,165, now U.S. Pat. No. 10,901,813, by Manzano et al. "Clustering and Monitoring System," filed herewith which is hereby incorporated by reference in its entirety.

BACKGROUND

It is impossible for a developer to manually monitor each call or passage of a data value during the real-time execution of an application. However, monitoring the data values which are being transmit during an execution of an application and detecting anomalies in those values can be valuable for a developer to detect problems with the application or optimize the performance of the system, which may include making changes to the code of an application.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing anomaly feedback monitoring and detection.

Figure 1:
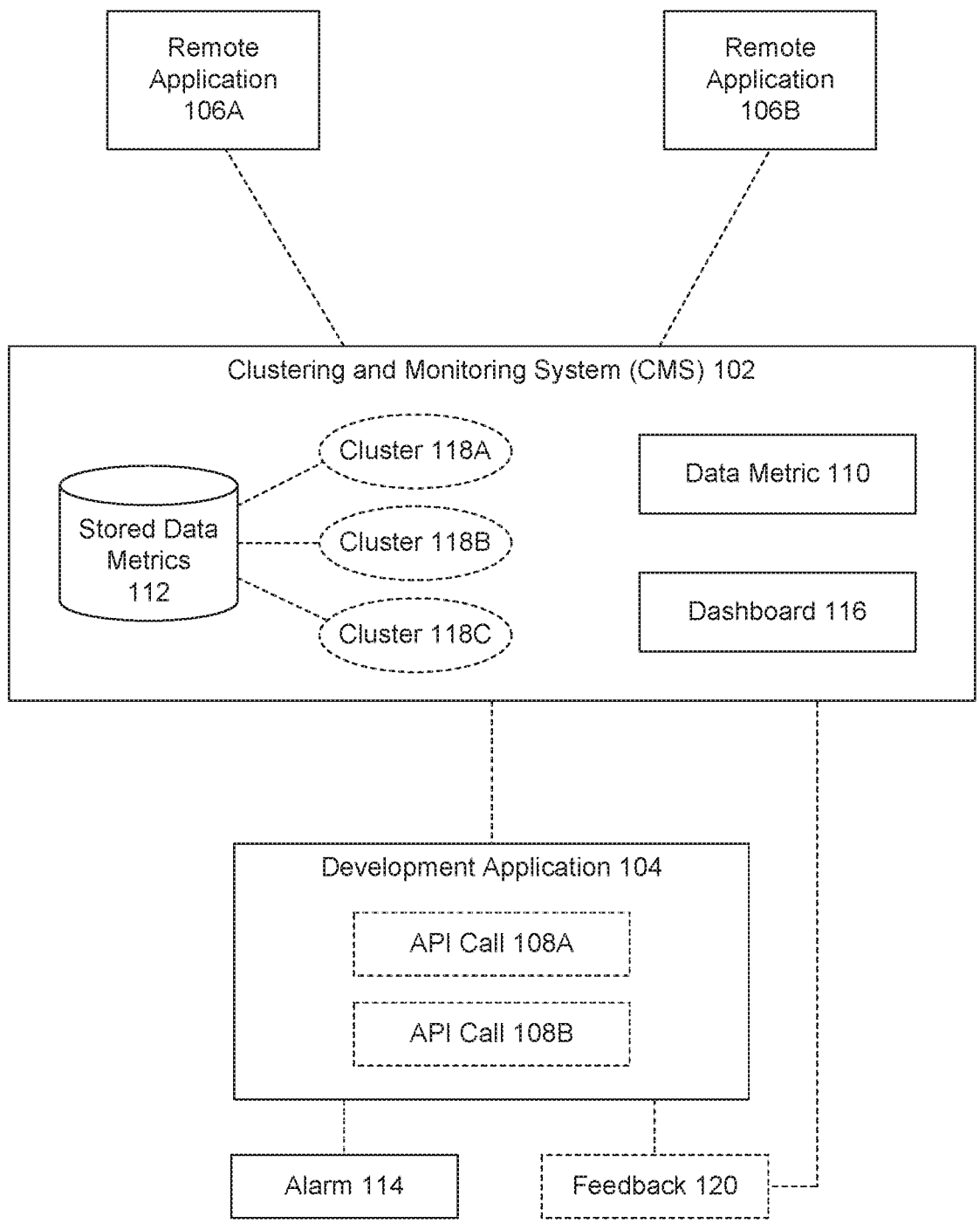
FIG. 1 is a block diagram illustrating example functionality for providing a clustering and monitoring system, according to some embodiments.

FIG. 1 is a block diagram 100 illustrating example functionality for providing a clustering and monitoring system according to some embodiments. In the example system, a development application 104 may be communicating with one or more remote applications 106A, 106B by making and/or receiving one or more application programming interface (API) calls 108A, 108B.

A clustering and monitoring system (CMS 102) may receive or monitor data associated with the devices that are executing or supporting the execution of development application 104, API calls 108, and/or remote applications 106. CMS 102 may cluster the data into various groups or clusters 118A-C that may indicate a system health or state. Then based on the monitoring and clustering, CMS 102 may provide notifications or alarms 114 to one or more developers about the system state. In an embodiment, alarm 114 may notify a developer when the system state has exceeded normal ranges of functionality or when other problems have been detected.

The developer may then take appropriate action in addressing the alarm 114. The actions may include changing the code of development application 104, pausing the execution of development application, or changing, adding, or removing API calls 108.

The data being received or monitored by CMS 102 may include data metrics 110. Data metrics 110 may include any data or indicators about the health, status, availability, or utilization of the capabilities or resources of one or more computing devices. Example data metrics 110 include but are not limited to memory (including disk storage) usage/availability, processor utilization, transmission bandwidth, and system load. In an embodiment, a dashboard 116 may receive and/or display data metric 110 data.

CMS 102 may retrieve or receive and monitor data metrics 110 about the operating or utilization status of one or more computing devices or machines supporting or executing development application 104, remote applications 106, including the transmission or processing of API calls 108. In an embodiment, remote applications 106 may share or otherwise make accessible data metrics 110 about the operating or utilization status of their respective systems or devices to CMS 102. In an embodiment, CMS 102 may have direct access to monitoring the system status and data metrics 110 of one more computing devices supporting the operations of development application 104.

In an embodiment, CMS 102 may receive streams or chunks of data metrics 110. Relying on numerous different conditional statements to process the data metrics, each of which must be checked or cross-referenced when each new data metric 110 is received, would require unsustainable amounts of processing power, computing cycles, and time to execute—and would otherwise be ineffective for monitoring system state, especially if the data metrics change. As such, CMS 102 may use machine learning and clustering to monitor and cluster data metrics 110, determine system status, and provide alarms 114.

In an embodiment, beginning with an initial set of stored data metrics 112, CMS 102 may define or form an initial set of clusters 118A, 118B, and 118C. A cluster 118 may include a set or combination of data metrics 110 with shared attributes. In an embodiment, the shared attributes may include data metrics 110 falling within particular ranges.

For example, the data metrics 110 may include memory usage data that indicate how much memory is being utilized or used during various periods of time, or during the processing of particular functions (e.g., API calls 108). Cluster 118A may represent a system state of 'low utilization' and include data metrics 110 that indicate 20% or less memory utilization. Cluster 118B may represent 'normal utilization' and include data metrics 110 that indicate system state of 20-40% memory usage, and cluster 118C may represent 'high utilization' and include data metrics 110 that indicate when memory usage has exceeded 40%.

Memory usage is just one example of a data metric 110 that may be used in clustering. In other embodiments may include other data metrics 110 (including combinations thereof) that may be used in defining and performing clustering operations. The number of clusters 118 may vary or be adjusted over time. Also, CMS 102 may allow a developer or other user to dynamically change which data metrics 110 (or combinations thereof) are used perform the clustering operations.

In an embodiment, a developer or other user may define what action or alarm 114 is to be taken when a new data metric is assigned or grouped to one of the clusters 118A-C. For example, when memory usage is 'high' (e.g., cluster 118C), alarm 114 may send a notification to the e-mail address and cell phone of a group of users. When memory usage is normal (e.g., cluster 118B), no notification may be issued, while alarm 114 for cluster 118A may indicate a pop-up notification is to be displayed on a designated device. The developer(s) or machines receiving the alarm 114 may then take any appropriate action to address the alarm 114.

In an embodiment, CMS 102 may also indicate which API call 108 or other code from development application 104 is associated with the alarm 114. By identifying and notifying the developer as to which API call 108 (or combination of API calls 108) resulted in an alarm 114 being issued, the developer may quickly identify what code needs to be modified without searching through the code line-by-line. This may save time and resources that would otherwise be required to identify which APIs, API calls 108, or other corresponding code is resulting in the alarm 114.

Development application 104 may be an application, program, or set of code that is modifiable by one or more developers. The application 104 may be in any stage of development, including initial development, quality assurance, alpha testing, or production. Remote applications 106 may include applications or programs with which development application 104 communicates using API calls 108. In an embodiment, a developer may not have direct access to the code of remote applications 106A, 106B for modification. In an embodiment, CMS 102 may monitor data metrics 110 between multiple development applications 104 which are modifiable.

In various embodiments, different clustering strategies may be used by CMS 102. For example, CMS 102 may use K means clustering in which CMS 102 partitions N observations (data metrics) into a specified number (K) of clusters, in which each observation belongs to the cluster with its nearest mean. Or, for example, CMS 102 may use cluster analysis in which objects are grouped in such a way that objects with the some group or set of attributes (including sharing the same range of values) are grouped or clustered together.

CMS 102 may begin with an initial set of clusters 118 and corresponding labels or alarms 114. However by utilizing machine learning, CMS 102 may adjust the clusters 118 and/or alarms 114 over time (with or without user input or feedback 120). For example, if CMS 102 is grouping data metrics 110 into three clusters based on both memory utilization and CPU usage, as new data metrics 110 with new values are received, CMS 102 may shift the bounds of each cluster 118 over time using machine learning, while maintaining the same number of clusters. Or, for example, a user may indicate that the number of clusters is to be increased to five, in which case CMS 102 may reprocess or re-cluster stored data metrics 112 and group new data metrics 110 accordingly.

In an embodiment, CMS 102 may adjust clustering based on data metrics 110 that are received during system usage. For example, as data metrics 110 are received and clustered into the closest corresponding clusters 118, CMS 102 may adjust the bounds or ranges of the clusters 118 over time. In continuing the memory usage example above, the 'high memory usage cluster 118B may shift from more than 40% up to 50% or down to 38% based on data metrics 110 that are received and processed or clustered by CMS 102 over time. This type of re-clustering or re-categorization would be difficult or impossible without the machine learning capabilities of CMS 102.

In an embodiment, a developer or other user (or group of users) may provide feedback 120 about alarms 114. Feedback 120 may be any manual or individual adjustments a user wants to submit to CMS 102 regarding alarms 114. Feedback 120 may include an adjustment to the wording of the notification or alarms 114, or devices or accounts (email addresses, phone numbers, user IDs, etc.) to which alarms 114 are transmit.

Feedback 120 may provide indication whether a particular data metric should still be an alarm. For example, clusters 118 may indicate that an alarm 114 should be transmit when CPU usage exceeds 50%. However, in response to an alarm 114 that indicates CPU usage is at 52%, a user may provide feedback 120 indicating that this no longer needs to be an alarm. CMS 102 may then reorganize or redefine clusters 118 and existing stored data metrics 112 to conform to feedback 120.

In an embodiment, CMS 102 may require a minimum number of feedback indications 120 before adjusting clustering. For example, CMS 102 may require at least 3 feedback notifications 120 or indications from each of at least three different users before clusters 118 are adjusted. Or, for example, CMS 102 may request authorization from an administrator prior to performing feedback-based adjustments.

In an embodiment, feedback 120 may include a user uploading pre-clustered data sets (e.g., stored data metrics 112) that CMS 102 is to integrate into existing clustering information, or use to replace one or more existing clusters 118. For example, existing clusters 118 may be based on memory usage. However, a user may upload clustered feedback data 120 that includes a set of data metrics clustered based on CPU usage, or CPU and memory usage. The user may indicate whether CMS 102 is to blend the uploaded cluster information into the existing cluster information, or use it to replace existing clusters 118. Or, for example, feedback 120 may include a request by a user to adjust clusters 118 to account for CPU and memory usage instead of just memory usage.

Figure 2:
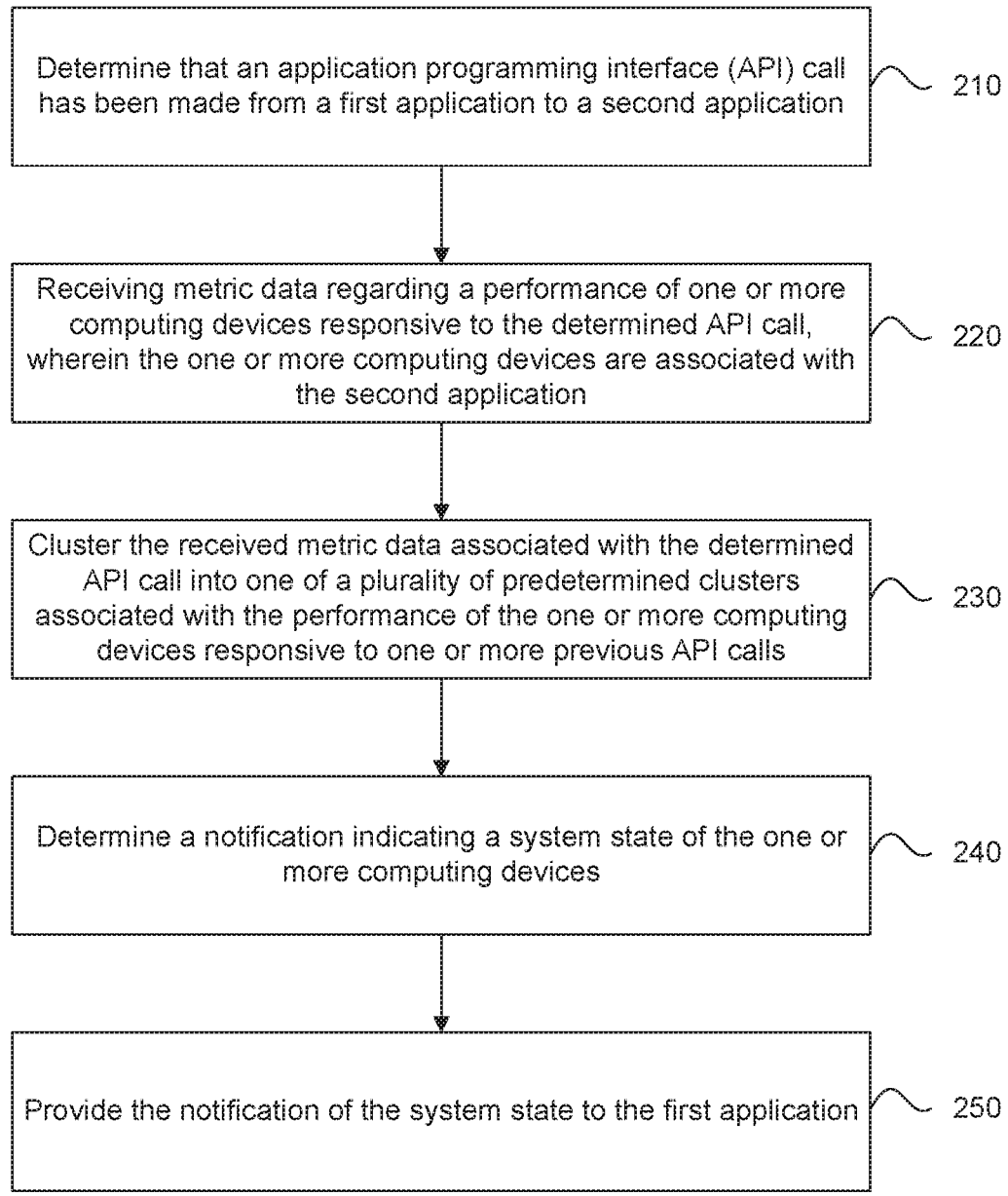
FIG. 2 is a flowchart illustrating example operations of a clustering and monitoring system, according to some embodiments.

FIG. 2 is a flowchart 200 illustrating example operations of a clustering and monitoring system (CMS) 102, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1. However, method 200 is not limited to the example embodiments.

In 210, it is determined that an application programming interface (API) call has been made from a first application to a second application. For example, CMS 102 may receive an indication that development application 104 is making an API call 108A, 108B to one or more remote applications 106A, 106B, or that remote applications 106 are transmitting a response to an API call 108 from development application 104. In an embodiment, CMS 102 may also monitor API calls 108 originating with remote applications 106 and to which development application 104 responds.

In 220, metric data regarding a performance of one or more computing devices responsive to the determined API call is received. For example, CMS 102 may directly monitor or receive metric data 110 from one or more computing devices that are supporting the execution of development application 104, remote applications 106, and/or the processing of API calls 108. The metric data 110 may include that that corresponds to resource use, availability, or utilization.

In 230, the received metric data associated with the determined API call is clustered into one of a plurality of predetermined clusters associated with the performance of the one or more computing devices responsive to one or more previous API calls. For example, CMS 102 may cluster newly received data metrics 110 into one or more of the predefined clusters 118A, B, C. Each cluster 118A-C may correspond to a different state based on a combination of one or more data metrics 110 that are captured during the execution of an API call 108.

In 240, a notification indicating a system state of the one or more computing devices is determined based on the clustering. For example, depending on which cluster 118 the metric data 110 belongs, CMS 102 may determine an action or alarm 114 that is be executed in response to the clustering.

In 250, the notification of the system state is provided to the first application. For example, CMS 102 may issue an alarm 114 that registers as a pop-up display on a monitor of a device executing development application 104. Or, for example, a notification 114 may be sent to the cellular phone of a developer who is responsible for maintaining development application 104.

Figure 3:
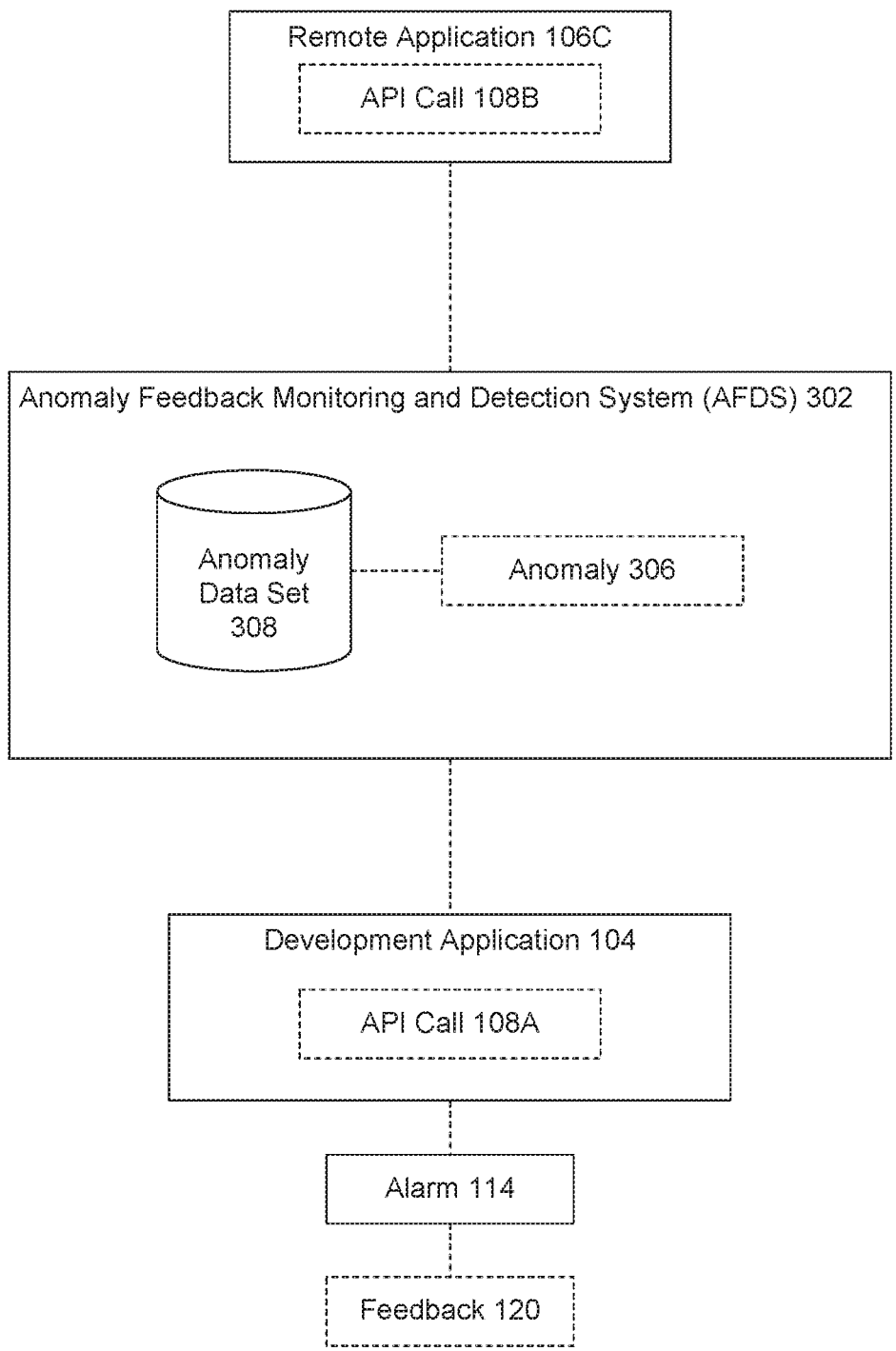
FIG. 3 is a block diagram illustrating example functionality for providing an anomaly feedback monitoring and detection system (AFDS), according to some embodiments.

FIG. 3 is a block diagram 300 illustrating example functionality for providing an anomaly feedback monitoring and detection system (AFDS) 302, according to some embodiments. AFDS 302 may monitor communications (e.g., API calls 108) between a development application 104 and one or more remote applications 106C to detect and notify users or other administrators when undesirable or unexpected data states are detected.

AFDS 302 may monitor API calls 108A, 108B (including responses thereto) made between development application 104 and remote application 106C. The API calls 108 may include requests for data values and/or include one or more data values that to be passed, transmit or otherwise communicated between the applications 104, 106C.

In an embodiment, remote application 106C may include a browser operating on a mobile device, laptop, or desktop computer. API call 108B may include a data request or login request (including a user id and password) to be processed by development application 104. Development application 104 (which may be operational on a web server) may then return responses using API calls 108A. Or, for example, API call 108B may include a data request (such as a stock price lookup), to which development application 104 returns API call 108A (that includes the requested stock price information).

AFDS 302 may receive or otherwise have access to what information is being provided or requested via API calls 108. For example, API calls 108 may pass through AFDS 302 before being transmit between development application 104 and remote application 106C. Or, for example, AFDS 302 may be configured to monitor the processing operations of development application 104, including having access to API call 108 data. Or, for example, the data being requested and/or provided via API calls 108 may be written to a log to which AFDS 302 has access.

Based on the provided or requested data values corresponding to API calls 108A, 108B, AFDS 302 may detect whether a data anomalous data state 306 has occurred and issue a corresponding notification or alarm 114 if such an anomaly 306 has been detected.

A data state may include a classification or determination whether a set of one or more detected data values were expected, or errant or anomalous (when compared against an anomaly data set 308). AFDS 302 may determine a data state of one or more API calls 108 made by one or more connectivity sessions, user identifiers, internet protocol (IP) addresses, or devices and determine whether the quality and/or quantity of data being transmit or requested is undesirable or unexpected.

An anomaly 306 may include an unexpected or errant data request or value (or set of requests or values) that is transferred between one or more instances of development application 104 and one or more instances of remote application 106C. In an embodiment, anomaly 306 may include, reference, or be defined by one or more corresponding anomaly data sets 308. Anomaly data set 308 may include a sample set of data or data pattern, quantification, or qualification that defines what constitutes an anomaly 306.

In an embodiment, anomaly data set 308 may include a pattern, such as three failed login attempts with the same username. Anomaly data set 308 may include time references such as three failed login attempts with the same username within 60 seconds. Anomaly data set 308 may include one or more data requests that are prohibited (such as particular tables including confidential information), which if requested may indicate an anomaly. Anomaly 306 may include any undesirable or unexpected data state.

In an embodiment, anomaly data set 308 may include prohibited data values that cannot be requested or passed between the applications 106c and 104, such as a banned username, IP address, or e-mail address. In an embodiment, anomaly data set 308 may define what comprises a denial of service attack or other known intrusion event for the particular system of development application 104.

AFDS 302 may implement machine learning and reinforcement learning processing, that enables a user (such as a developer or administrator) to train AFDS 302 as to what constitutes and does not constitute an anomaly 306, particularly for development application 104. For example, when a notification or alarm 114 is issued by AFDS 302 indicating that an anomaly 306 or other unusual system or data state has been detected, a user may provide feedback 120. Similar to what was described above with respect to CMS 102, AFDS 302 may receive a positive or negative feedback indicator 120 and adjust the bounds of what is and is not considered an anomaly for a particular development application 104.

In an embodiment, AFDS 302 may monitor communications between multiple, different types of development applications 104, each of which may include their own uniquely defined anomalies 306. The different development applications 104 may each be communicating with the same remote application 106C and/or have access to an overlapping or related data sets or databases.

By enabling a user to provide feedback 120, AFDS 302 enables the definitions of an anomaly 306 to change over the lifespan of an application 104. For example, initially a denial-of-service attack may be defined by anomaly data set 308 as being as one thousand login attempts or data requests (across multiple different devices or remote applications 106C) received within 5 seconds.

However, as the number of users or machines supporting the execution of one or more instances of development application 104 grows, an alarm 114 indicating that a denial-of-service attack (306) has been detected because one thousand data requests were received within 4 seconds may no longer be applicable. As such, an administrator may provide negative feedback 120 indicating that this is a new normal usage for development application 104, and AFDS 102 may adjust its definition of anomaly data set 308 for a denial-of-service attack 306 accordingly.

In addition to monitoring data values being passed between applications 104 and 106C, in an embodiment, AFDS 302 may also include monitoring of system states similar to that described above with respect to CMS 102. For example, an anomaly 306 may include both data sets or data patterns that have been detected, and increased CPU, memory, or other resource usage or utilization. In an embodiment, CMS 102 and AFDS 302 may be used together to monitor both system states and data states across one or more development applications 104.

Because of the enormous variety in the possible data values that are passed back and forth between applications 104 and 106C, AFDS 302 may primarily utilize machine learning with reinforcement learning processing, rather than clustering. For example, clustering may require hundreds of thousands of clusters for all the various possible data sets, which may require significant computing resources and ultimately be ineffective at detecting anomalies. The reinforcement learning processing of AFDS 302 in monitoring API calls 108 enables a developer to provide feedback 120 in real-time which allows anomalies 306 to be adjusted or redefined.

In an embodiment, a user or developer may upload new data sets 308 for new anomalies 306 at any time. AFDS 302 may then integrate the new data sets 308 into its existing monitoring, processing, and detecting functionality. In an embodiment, an anomaly 306 may be any set of one or more data values that are unexpected or undesirable. An anomaly 306 may represent an error, a virus, a hacker attack, intrusion detection, or any other errant or undesirable system data state.

AFDS 302 may receive or monitor the API calls 108A, 108B between the applications 104, 106C, particularly the data values being passed within the API calls 108, and compare the values to pre-defined anomalies 306 to determine if the API calls 108 trigger an alarm 114.

Alarm 114 may include sending an email or text message to an e-mail address, cellular phone, or other user account or device associated with a developer that is responsible for maintaining development application 104. In an embodiment, alarm 114 may include an identifier, link, or other reference to the one or more API calls, usernames, IP addresses, or other information indicating which data values triggered the alarm 114.

Figure 4:
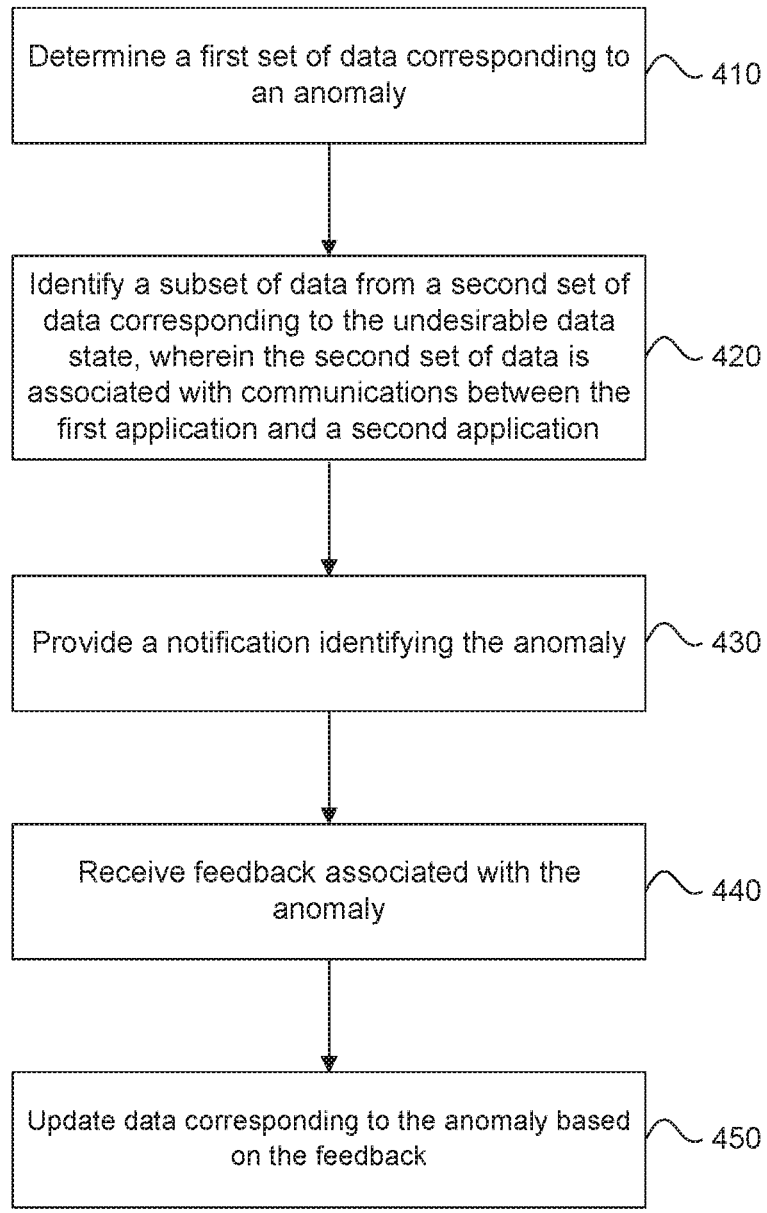
FIG. 4 is a flowchart illustrating example operations of an anomaly feedback monitoring and detection system (AFDS), according to some embodiments.

FIG. 4 is a flowchart 400 illustrating example operations of an anomaly feedback monitoring and detection system (AFDS), according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIG. 3. However, method 400 is not limited to the example embodiments.

In 410, a first set of data corresponding to an anomaly is determined. For example, AFDS 302 may receive from a user or developer anomaly data set 308 that includes the definition of one or more undesirable data states or anomalies 306 for development application 104. The anomaly data set 308 may include actual data values or patterns of data values or data requests that are determined to be errant or problematic specifically for development application 104.

In 420, a subset of data from a second set of data corresponding to the undesirable data state is identified, wherein the second set of data is associated with communications between the first application and a second application. In an embodiment, AFDS 302 may monitor API calls 108 (e.g., data that is being requested and/or provided) between one or more instances of remote application 106C and one or more instances of development application 104 across one or more devices. For example, development application 104 may include multiple instances of a particular program that are executing across one or more servers. Remote application 106C may include one or more web applications that are being accessed from one or more different cell phones, laptops, or other devices. AFDS 302 may compare these data requests and responses between applications 104 and 104C against one or more anomaly data sets 308 to detect any anomalies 306 that may occur in the communications.

In 430, a notification identifying the anomaly is provided. For example, based on detecting an anomaly 306, AFDS 302 may issue a notification or alarm 114 to one or more developers. Alarm 114 may include a text message, email message, automated phone call, pop-up window on one or more monitors, sound, or other notification to one or more pre-designated users. In an embodiment, alarm 114 may include an automatic or temporary suspension of processing activities by development application 104, or a termination of a connectivity session with one or more remote applications 106C. The alarm 114 may include a reference to the one or more API calls 108 that are determined by AFDS 302 to be associated with the anomaly 306. The references may include a date/time of the API calls 108, the IP addresses or usernames associated with the API calls 108, or other API call information.

In 440, feedback associated with the anomaly is received. For example, AFDS 302 may receive feedback 120 from the developer confirming whether or not the anomaly should have been issued. The feedback 120 may either confirm that the alarm 114 corresponding to a detected anomaly 306 was rightly issued, or may indicate that the alarm 114 or anomaly definition or data set 308 should be adjusted and no anomaly 306 should have been detected or alarm 114 issued.

In addition to providing feedback 120, a developer may take corrective action to address the alarm 104. The corrective action may include modifying the code of development application 104, or stopping an execution of one or more instances of development application 104.

In 450, data corresponding to the anomaly based on the feedback is updated. For example, based on feedback 120, AFDS 302 may update the anomaly data set 308 and existing anomaly definitions 306. AFDS 302 may expand or contract the definition of a particular anomaly 306 based on integrating feedback 120 with an existing anomaly data set 308.

Figure 5:
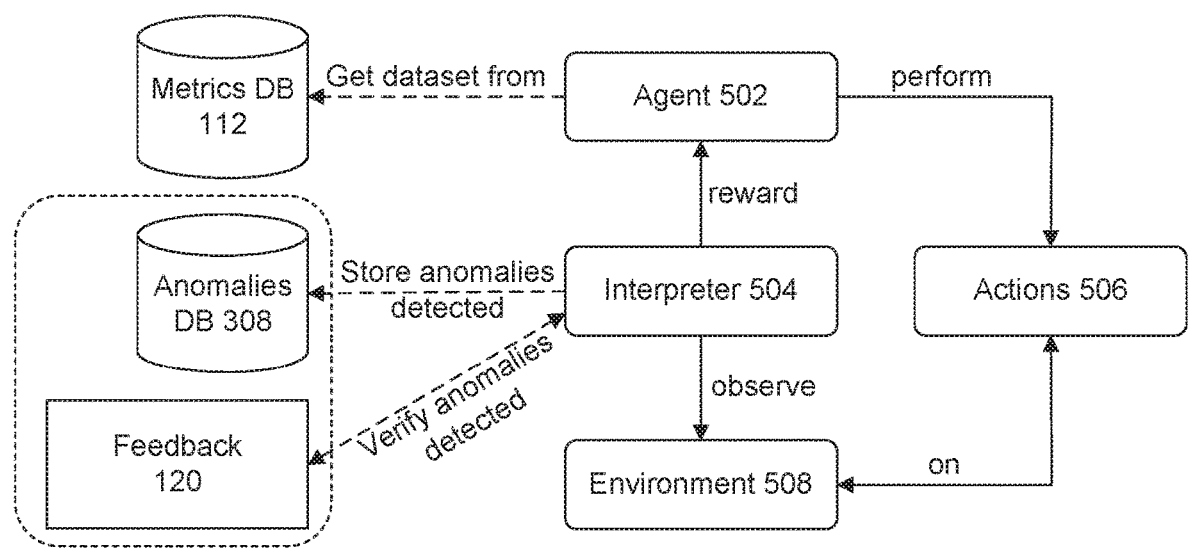
FIG. 5 is a block diagram illustrating example operations of a feedback monitoring and integration system, according to some embodiments.

FIG. 5 is a block diagram 500 illustrating example operations of a feedback monitoring and integration system, according to some embodiments. The feedback monitoring and integration system may be implemented and used by AFDS 302 according to some embodiments.

An agent 502 may include one or more processors that perform actions, such as issue alarms 114, for a particular system executing (or supporting the execution of) one or more instances of development application 104. An interpreter 504 may observe or detect anomalies 306 that are occurring during the operations of the system, including communications with one or more remote systems 106.

Actions 506 may include data metrics 110 or data transfers of API calls 108 that are observed, received, or otherwise monitored during operations of development application 104 in a particular operating environment 508. Environment 508 may indicate a production state of development application 104, such as initial development, quality assurance, alpha/beta testing, or full production.

In an embodiment, AFDS 302 may enable or disable specific anomalies 306 based on in which operating environment 508 development application is executing or is currently deployed. For example, intrusion detection anomalies 306 may be disabled during quality assurance, but enabled during alpha testing or full production.

When an anomaly 306 is detected an alarm 114 is issued. However, as noted above, a developer may provide feedback 120 (or new data sets 308 or data metrics 112) that are received by interpreter 504. Based on the feedback 120, interpreter 504 may adjust the anomalies 306, clusters 118, and/or alarms 114 accordingly.

Figure 6:
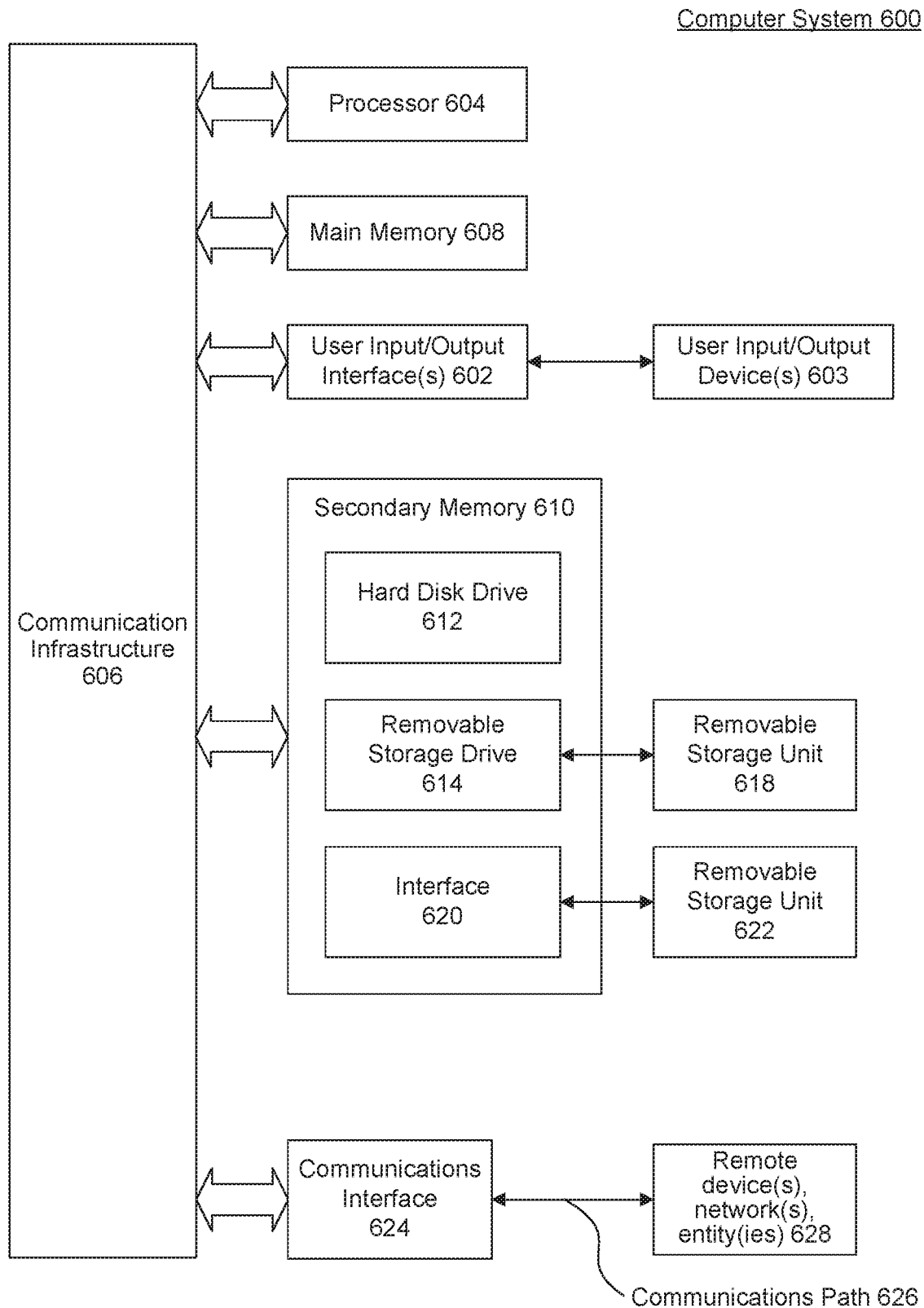
FIG. 6 is example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include customer input/output device(s) 603, such as monitors, keyboards, pointing devices, etc., which may communicate with communication infrastructure 606 through customer input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions), "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
   determining a first set of data corresponding to an anomaly indicating an undesirable data state for a first application, wherein the first set of data includes an identification of data that the first application is prohibited from requesting from a second application based on presence of the data in a corresponding request from the first application to the second application;
   identifying a subset of data from a second set of data corresponding to the undesirable data state, wherein the second set of data is associated with communications between the first application and the second application;
   providing a notification identifying the anomaly, wherein the anomaly comprises a request for the data that is prohibited from being requested;
   receiving, responsive to the providing, feedback associated with the anomaly; and
   updating data corresponding to the anomaly based on the feedback, wherein based on positive feedback the identified subset of data is associated with the anomaly in addition to the first set of data, and wherein based on negative feedback the identified subset of data is disassociated with the anomaly.

2. The method of claim 1, wherein the second set of data comprises one or more values passed between the first application and the second application using an application programming interface (API).

3. The method of claim 2, wherein the subset of data includes one or more values different from the one or more values of the first set of data.

4. The method of claim 3, further comprising:
   monitoring a stream of data based on an operation of the first application for the anomaly.

5. The method of claim 4, wherein the notification is provided to an account associated with a user and provides a reference to an API call associated with the anomaly.

6. The method of claim 5, further comprising:
   determining one or more additional sets of data corresponding to one or more additional anomalies.

7. The method of claim 6, wherein the monitoring comprises detecting the anomaly based on a comparison of a data value from the communications to a data value from the first set of data.

8. A system comprising:
   a memory; and
   at least one processor coupled to the memory and configured to:
   determine a first set of data corresponding to an anomaly indicating an undesirable data state for a first application, wherein the first set of data includes an identification of data that the first application is prohibited from requesting from a second application based on presence of the data in a corresponding request from the first application to the second application;
   identify a subset of data from a second set of data corresponding to the undesirable data state, wherein the second set of data is associated with communications between the first application and the second application;
   provide a notification identifying the anomaly, wherein the anomaly comprises a request for the data that is prohibited from being requested;

receive, responsive to the providing, feedback associated with the anomaly; and update data corresponding to the anomaly based on the feedback, wherein based on positive feedback the identified subset of data is associated with the anomaly in addition to the first set of data, and wherein based on negative feedback the identified subset of data is disassociated with the anomaly.

9. The system of claim 8, wherein the second set of data comprises one or more values passed between the first application and the second application using an application programming interface (API).

10. The system of claim 9, wherein the subset of data includes one or more values different from the one or more values of the first set of data.

11. The system of claim 10, wherein the at least one processor is further configured to:

monitor a stream of data based on an operation of the first application for the anomaly.

12. The system of claim 11, wherein the notification is provided to an account associated with a user and provides a reference to an API call associated with the anomaly.

13. The system of claim 12, wherein the at least one processor is further configured to:

determine one or more additional sets of data corresponding to one or more additional anomalies.

14. The system of claim 13, wherein to monitor the stream of data, the at least one processor is further configured to:

detect the anomaly based on a comparison of a data value from the communications to a data value from the first set of data.

15. A non-transitory computer-readable device having instructions stored thereon that, when executed by at least one computing device, cause the at least one computing device to perform operations comprising:

determining a first set of data corresponding to an anomaly indicating an undesirable data state for a first application, wherein the first set of data includes an identification of data that the first application is prohibited from requesting from a second application based on presence of the data in a corresponding request from the first application to the second application;

identifying a subset of data from a second set of data corresponding to the undesirable data state, wherein the second set of data is associated with communications between the first application and a second application;

providing a notification identifying the anomaly, wherein the anomaly comprises a request for the data that is prohibited from being requested;

receiving, responsive to the providing, feedback associated with the anomaly; and updating data corresponding to the anomaly based on the feedback, wherein based on positive feedback the identified subset of data is associated with the anomaly in addition to the first set of data, and wherein based on negative feedback the identified subset of data is disassociated with the anomaly.

16. The device of claim 15, wherein the second set of data comprises one or more values passed between the first application and the second application using an application programming interface (API).

17. The device of claim 16, wherein the subset of data includes one or more values different from the one or more values of the first set of data.

18. The device of claim 17, wherein the instructions further cause the at least one computing device to perform operations comprising:

monitoring a stream of data based on an operation of the first application for the anomaly.

19. The device of claim 18, wherein the notification is provided to an account associated with a user and provides a reference to an API call associated with the anomaly.

20. The method of claim 1, wherein the request for prohibited data comprises a banned username.

* * * * *